Nov. 3, 1925.

Re. 16,195

J. M. BAITINGER

METHOD OF FEEDING PEOPLE

Original Filed July 5, 1919 4 Sheets-Sheet 1

Inventor

John M. Baitinger

By Fischer & Lagaard

Attorneys

Nov. 3, 1925. Re. 16,195

J. M. BAITINGER

METHOD OF FEEDING PEOPLE

Original Filed July 5, 1919 4 Sheets-Sheet 2

Inventor

John M. Baitinger

By Fischer & Pagaard

Attorneys

Nov. 3, 1925. Re. 16,195
J. M. BAITINGER
METHOD OF FEEDING PEOPLE
Original Filed July 5, 1919 4 Sheets-Sheet 3
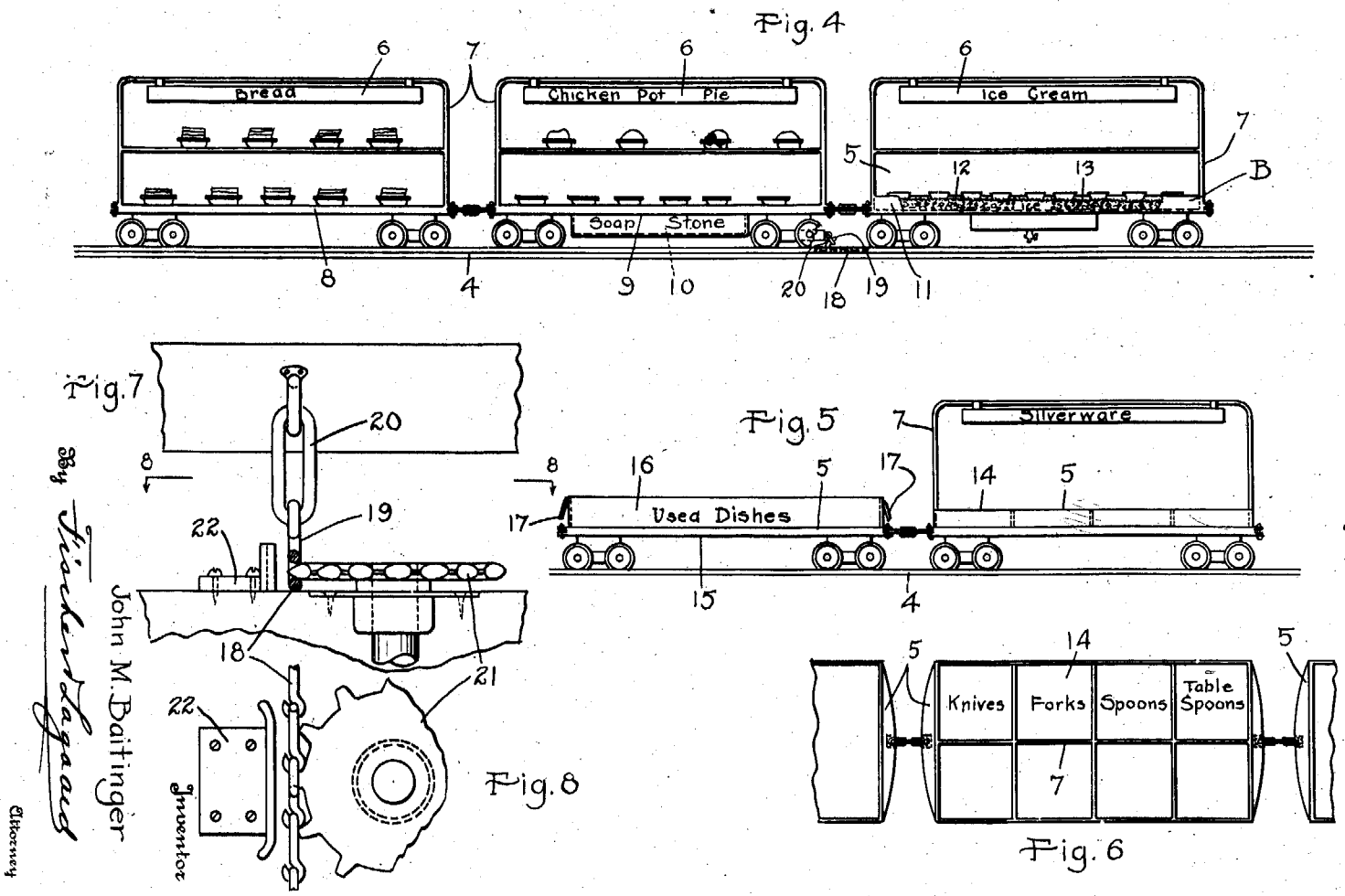
Inventor
John M. Baitinger
By Fischer & Lagoard
Attorney Nov. 3, 1925. Re. 16,195

J. M. BAITINGER

METHOD OF FEEDING PEOPLE

Original Filed July 5, 1919 4 Sheets-Sheet 4

Inventor

John M. Baitinger

By Fischer & Lagaard

Attorneys

Reissued Nov. 3, 1925. Re. 16,195

UNITED STATES PATENT OFFICE.

JOHN M. BAITINGER, OF ST. PAUL, MINNESOTA.

METHOD OF FEEDING PEOPLE.

Original No. 1,442,211, dated January 16, 1923, Serial No. 308,885, filed July 5, 1919. Application for reissue filed April 2, 1924. Serial No. 703,826.

*To all whom it may concern:*

Be it known that I, JOHN M. BAITINGER, a citizen of the United States, residing at St. Paul, in the county of Ramsey and State of Minnesota, have invented a new and useful Improvement in Methods of Feeding People, of which the following is a specification.

My invention relates to the method of feeding a large number of people conveniently in a short time, the primary feature being that various kinds of foods are passed before the people seated at the dining table so that they can readily help themselves as the food passes before them on a train of cars.

The cafeteria plan of restaurant is very popular today where food is served so that the people can pass by a counter and select the various foods that they desire and then carry the food on a tray to a dining table. This apparently is an ideal way of feeding people, but it is not satisfactory at certain times to take care of a large number of people with least inconvenience to each of them and to serve them with just the kind of food that they desire, because of the fact that if a large number of people entered a restaurant of this character together, some of them hold up others from passing by the counters which display the food and thus delay those that may be in a hurry to select their meal and depart from the restaurant. My method of feeding people overcomes this difficulty by allowing the people to enter the restaurant and immediately be seated at the dining table while a train of cars carrying the various foods passes automatically before them and they can help themselves without inconveniencing any of the people seated at the table.

The food train continues to travel centrally through the dining table while the people are seated on either side of the same and if they do not get the food they desire the first time that the car carrying the same passes by their place, they can help themselves the next time it passes by, the cars being filled as they pass through the kitchen and the food being dished out into individual helpings so that it can be readily removed by the people seated at the dining table.

In carrying out my method a set price for each can be arranged so that all pay the same price and allow the patrons to help themselves to as many helpings as they desire, as it is evident that some will eat more and some less so that when the sum total is taken into consideration, it will all equalize itself so that a single price for a meal can be agreed upon, or my method provides means whereby each individual can pay for just what they get and thus provide a simple, inexpensive method of feeding a large number of people at one time. The method provides means whereby a minimum amount of help is required to successfully operate the same thus materially reducing the cost of feeding the people. This will be readily understood when it is taken into consideration that no waiters are required, or dish collectors as the food is passed before the people in a train of cars and some of the cars are so constructed as to receive the used dishes to return them to the kitchen, where they are quickly removed.

To assist in describing my method, I have illustrated, in the drawings, a simple mechanical construction for carrying out the same, it being evident that various means can be provided for carrying out this method.

Figure 4 illustrates a portion of the food train, showing some of the cars which make up the train.

Figure 5 illustrates another portion of the train.

Figure 6 illustrates a plan view of a portion of the train, some of the cars being broken away.

Figure 7 is a detail of a portion of the mechanism.

Figure 8 is a view on the line 8—8 of Figure 7.

Figure 1:
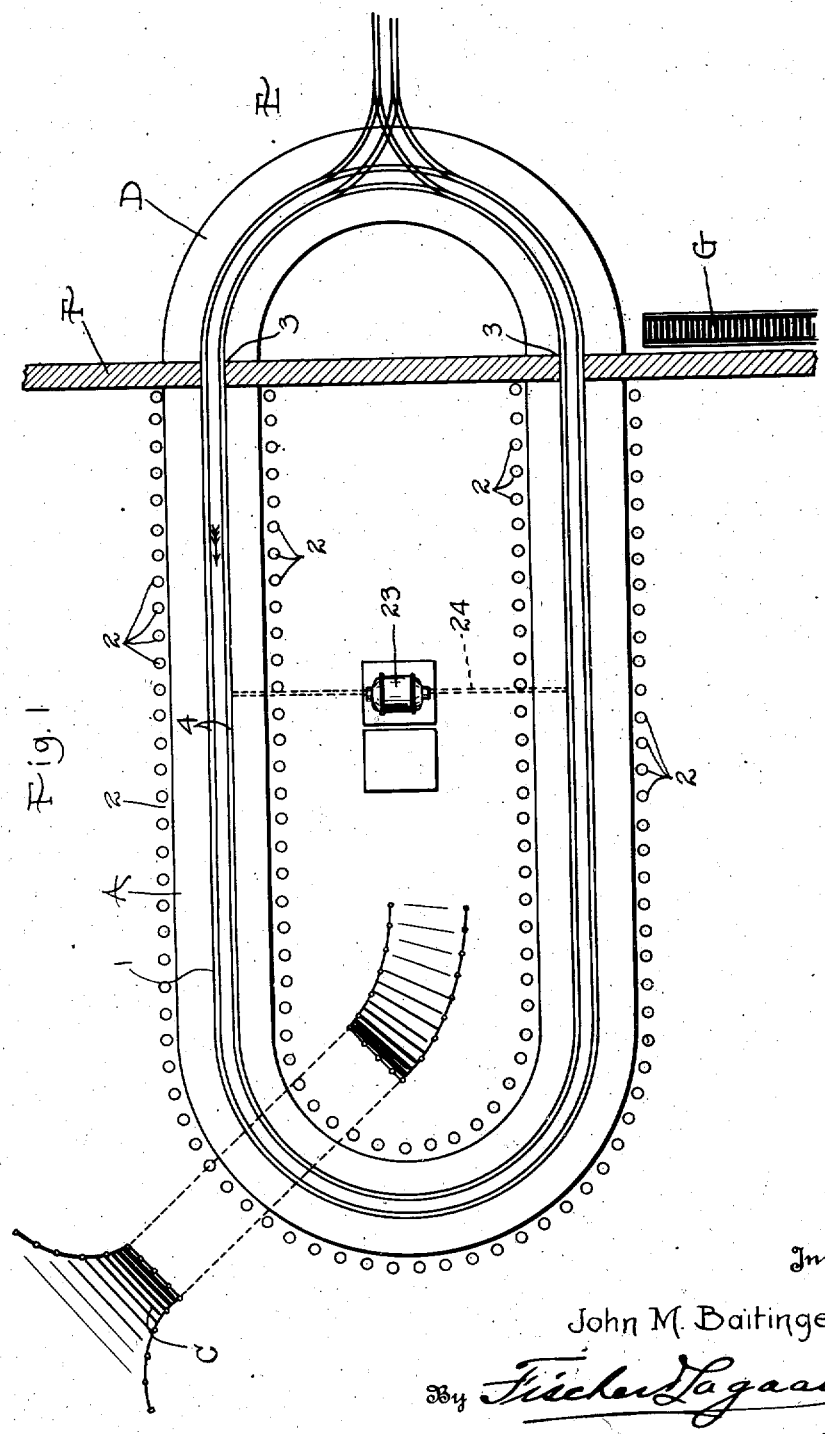
Figure 1 illustrates, diagrammatically, a plan view of a form of dining table which can be used in carrying out my method.
Figure 2:
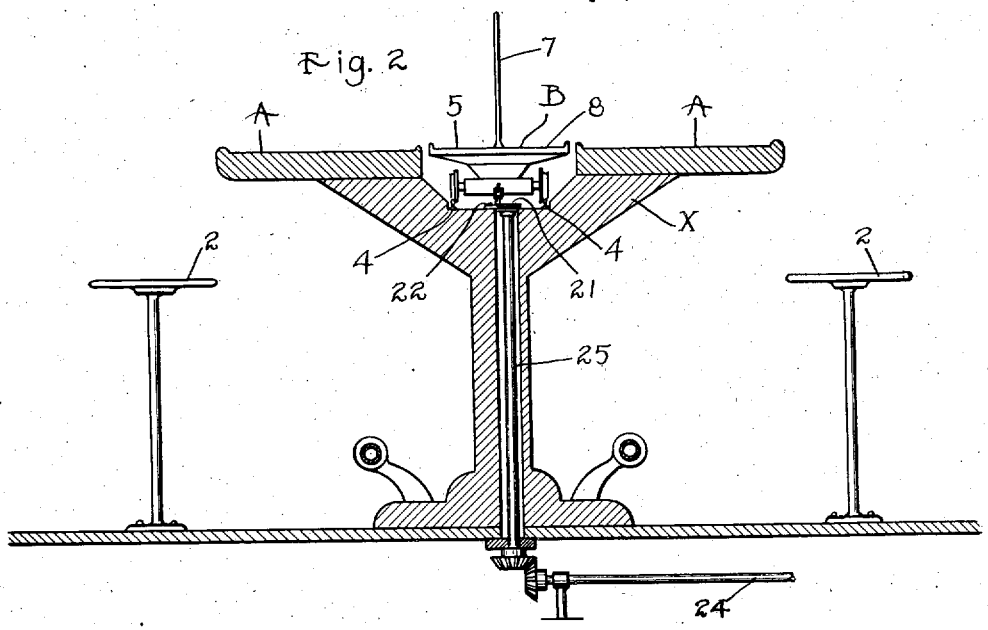
Figure 2 illustrates a cross section on the line 2—2 of Figure 1 of the dining table.
Figure 3:
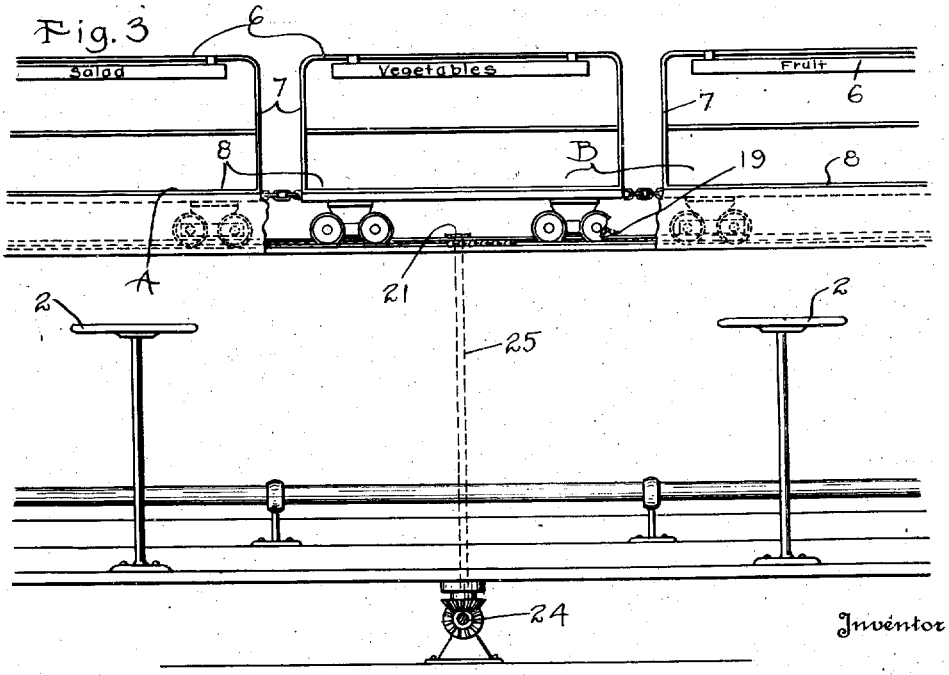
Figure 3 is a side elevation of a portion of the dining table, part of which is broken away.

In carrying out the method, the dining-room of the restaurant is provided with a counter indicated at X having two tables or platforms A, with a track such as 1 for a food train centrally located between the said tables so that a food train B can be passed automatically around the platforms or tables to display food to the people seated at the same. Chairs or stools 2 are provided for the people, of any construction, and a subway C is provided so that people can pass from the outside of the tables to the inner side, thus allowing them to be seated adjacent either table thereby accommodating a large number of people at one time.

A portion D of the counter X extends through the kitchen E, which is separated from the dining-room by the wall F so that the kitchen or no portion of the same is visible from the dining-room, but openings 3 are provided in the wall F to allow the food train to pass freely through and into and out of the kitchen when it is in operation. This construction provides a very neat appearing dining-room and if it is desired a very elaborate food train can be provided to display the various foods as the train passes along the dining tables. The kitchen is arranged in any suitable manner so that the train can be supplied with food when it is in operation, each car being filled as it passes through the kitchen with the food dished into individual helpings, the train being kept in motion, thus causing no delay in serving those seated at the table and allowing them to freely help themselves. A suitable gravity carrier G, of any well-known construction, may be used to remove the trays of used dishes and while only one gravity carrier G is illustrated, it is obvious that any number can be used in the kitchen to carry out my method. The train travels along the dining tables A in the direction of the arrows illustrated in Figure 1. A suitable switch not shown in the drawings can be provided in the kitchen so as to remove any or all of the cars of the train from the track, if it is desired.

The train B travels on the rails 4, which are secured in a suitable manner in the track such as 1 in the counter X, and is made up of a series of cars or plates 5, which are connected together in any suitable manner, each car having a sign 6, which is carried by a support 7, to designate what the car or plate contains or carries, so that the people seated at the tables can see at a glance what is on the same and be ready to help themselves if they desire some of the food on the same when it passes their place. The cars or plates 5 are preferably similar to flat cars so that the food can be readily removed as the train passes automatically through the dining table. All of the illustrations in the drawing are only diagrammatic, as it is clearly evident that any suitable train can be provided of any suitable mechanical construction. It is evident that in view of the curved track, the wheels of the cars, must be swivelly connected to the bodies in any well known manner. It is essential, however, that plain cars, or plates such as 8, are provided in the train for carrying bread and other foods of this nature; also a heated car 9, which is provided with a compartment 10 for carrying a heated soap stone, the top of this car being of material such as aluminum to transmit the heat freely to the dishes containing the food on the top of the same, and this car being for the purpose of carrying foods that it is desired to keep warm until they are served.

A refrigerator car 11 is also provided in the train, which is formed so as to carry a layer 12 of cracked ice below the screen top 13, so that ice cream or other foods that it is desired to keep cool can be placed directly on the top of the ice on the screen 13, and a silverware car 14 is formed with compartments for the various silverware required in a dining-room. The used dish car or plate 15 has a dish tray 16, which is freely removed by the handles 17 when it is full of used dishes, as this car comes into the kitchen and a clean, empty dish tray placed on the plate 15. It is obvious that the heated car 9 can be heated by any suitable means and it is also evident that the refrigerator car 11 can be of any suitable construction. It is preferred, however, that the cars or plates be opened to such an extent that the food can be freely removed from the same.

The train of cars B are adapted to be driven in any suitable manner, the drawing illustrating the train B connected to a continuous articulated drive chain belt 18, which extends below the cars 5 and is carried by the same by means of the connecting hooks 19 and links 20 to each of the plates or in any suitable manner so that the belt will be held in place below the cars 5 and to slowly draw the train of plates B around the tracks 4 so that the people at the dining table can freely and easily remove the food from the train B. The speed of the train can be regulated by the driving mechanism.

The chain or belt 18 is driven by a suitable sprocket 21 and a guard 22 is provided to hold the chain 18 into engagement with the sprocket. A suitable electric motor 23, which is positioned in the floor of the dining-room, as illustrated in Figure 1, operates the drive shaft 24, which is connected by suitable gears to drive the shaft 25 and the shaft 25 is rigidly secured to the sprocket 21 so that when the motor 23 operates, the chain 18 will be operated by the sprocket 21 and the plates 5 connected to the chain will be drawn around the tracks 4. It is evident that the train can be drawn in any suitable manner, the drawing merely illustrating the particular construction shown for describing my method.

When a person is through eating, he places his used dishes on the car 15 and they are returned to the kitchen automatically, leaving the place clean for the next person. This should be a rule of a restaurant carrying out this method and thereby providing a clean place for the next person wishing to dine at the table. By the use of this method people can be fed much cheaper than with the present means and thus if it is desired, one price can be arranged for all of the people eating at the table A, as it is clearly evident that some will eat less than others and no one will feel that they would want to overeat at a public table of this nature, while it will be permissible to eat all they desire, so that they can freely help themselves to more than one helping if they wish.

Figure 9:
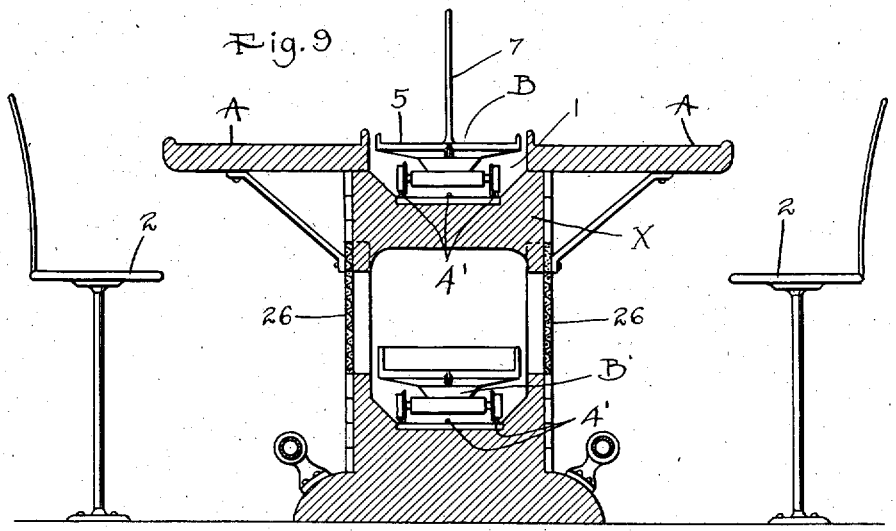
Figure 9 is a cross section similar to Figure 2, illustrating an alternative construction.
Figure 10:
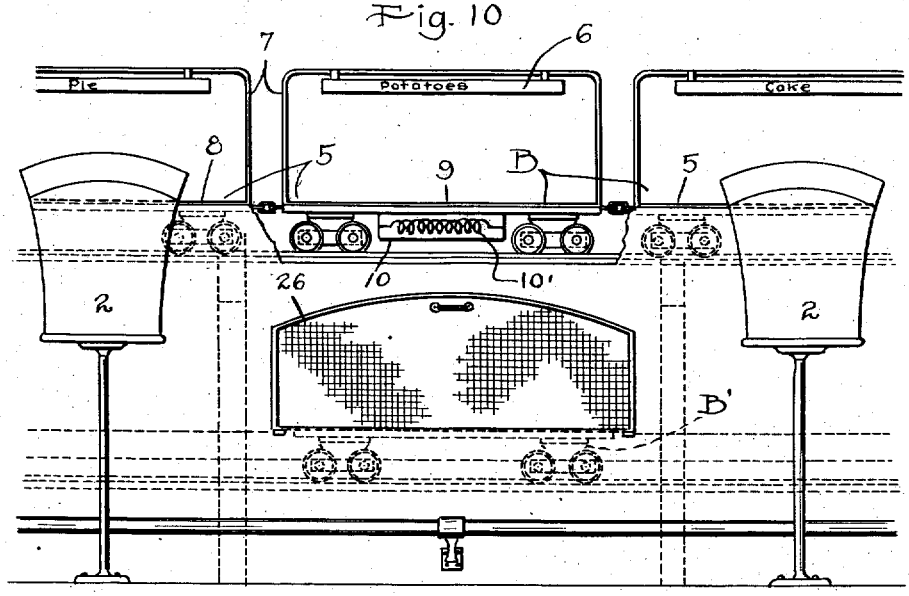
Figure 10 is a side elevation of the construction of dining table illustrated in Figure 9, only a portion of the same being illustrated.

The construction of the device, illustrated in Figures 9 and 10, provides an auxiliary train B′ centrally located below the train B in the table A for used dishes only, so that in this construction the used dishes can be returned to the kitchen by means of the train B′ and access to the train B′ is had through the screen door 26 so that the dishes can be placed on the train B′ and returned to the kitchen without interfering with the food train B, the food train running on top of the counter and displaying the food in the same manner as heretofore described. In the construction of train illustrated in Figures 9 and 10, a third rail track 4′ is provided so that the trains B and B′ can be driven by a suitable electric motor car of ordinary construction. It is also evident that the train can be lighted at night by electricity, in the ordinary well-known manner, and if it is desired some of the cars heated by eletrical means. In Figure 10 at 10′, an electrical heating unit is shown which may be connected to the third rail in any well known way to provide the requisite electrical energy for heating the unit.

The food train B operates continuously during serving hours and is supplied from the kitchen in the most practical way. A large number of people can be seated at the tables A by using the space on the inner and outer sides of the train, the subway C forming a unique means for passage to and from the inner side of the same. If it is desired to carry out the method in such a way that each person pays only for what he eats, it can be arranged so that he can put his order on the train and have it carried to the kitchen where it can be filled, having a number to designate each place, or they can help themselves and a checker can issue a ticket or check of the amount which should be paid by each person when leaving the restaurant. The principal idea in the method is to feed a large number of people in the shortest possible time and at a minimum cost so as to give them as much for their money as possible, doing away with all unnecessary help and the inconvenient old methods of handling the foods and dishes, still giving the best of service.

The construction illustrated in the drawing is only diagrammatic and the method can be carried out by any suitable construction and in any suitable manner within the scope of the following claims.

I claim:

1. In a food serving mechanism, a table, a plurality of normally open food receptacles adapted to be successively moved along said table to accessibly display said food, means for maintaining some of said food receptacles at a predetermined temperature and means for interchangeably attaching said temperature maintaining means upon other of said receptacles.

2. In a food serving mechanism, a table, a plurality of normally open food receptacles adapted to be successively moved along said table to accessibly display the food therein, and detachable means mounted on some of said food receptacles for maintaining said receptacle and the food within the same at a predetermined temperature.

3. In combination, a counter, a food carrier mounted on the upper portion of said counter, a pair of tables mounted on either side of said food carrier projecting over said counter, food receptacles accessible from both sides mounted on the carrier, a used dish conveyer positioned within said counter below said food conveyer and hinged doors positioned at intervals along said counter to give access to said used dish conveyer.

4. In a food serving mechanism, a continuous circuitous counter, an endless carrier positioned along said counter, a circuitous endless table positioned on each side of said endless carrier, seats positioned on the inside and outside of said counter adjacent said tables and means for conducting customers from the inner table to the outer table.

5. In a food serving mechanism, a continuous circuitous counter, an endless carrier positioned along said counter, a circuitous endless table positioned on each side of said endless carrier, seats positioned on the inside and outside of said counter adjacent said tables and a subway for conducting customers from the inner table to the outer table.

6. A serving mechanism for restaurants comprising a continuous circuitous counter, an endless food carrier positioned on the upper portion of said counter, a continuous table positioned along the outside of said carrier, seats positioned adjacent said table, a second continuous table positioned on the inside of said carrier, seats positioned adjacent said second table, and a subway leading from the interior of said circuitous counter to the exterior thereof for conducting customers from the inner seats to the outside.

7. In a mechanical restaurant, including a dining table, a food train adapted to pass through the center of the top of said table, means for operating said train, said train being composed of a series of individual cars for carrying various kinds of foods past the people seated at the dining table and having heated cars, refrigerator cars, dining utensil cars, dirty dish cars and plain cars, all of which are open and are freely accessible to the people seated at the table, for the purposes specified.

8. A dispensing system such as described, comprising an articulated conveyer, adapted to have containers thereon; means for moving said conveyer through a predetermined course; a platform contiguous to said conveyer whereby articles may be removed from the conveyer onto said platform and an auxiliary conveyer mounted on the underside of said first mentioned conveyer.

9. A dispensing system such as described comprising a conveyer composed of a series of plates all similar and successively articulated to one another and mounted at one side upon a continuous chain belt; sprocket wheels for moving said chain belt through a predetermined course; a platform contiguous to said conveyer whereby articles may be removed from said conveyer onto said platform; and an auxiliary conveying means mounted beneath said first mentioned conveyer and operated in unison therewith.

10. A dispensing system such as described comprising a conveyer composed of a series of plates adapted to have containers mounted thereon; an articulated chain belt secured at one side to each of said plates; means for moving said chain belt through a predetermined course; means for supplying said plates and containers with a heating medium; a platform contiguous to said conveyer whereby articles may be removed from said conveyer onto said platform.

11. A conveyer system such as described comprising a series of plates adapted to have containers mounted thereon; an articulated chain belt secured to said plates on one side thereof; sprocket wheels for maintaining said chain belt in predetermined relation; means for moving said belt by rotation of one of said sprocket wheels; guide tracks mounted beneath said series of plates and casters swivelly mounted on the underface of said plates and engaging said guide tracks for supporting said conveyer in operative position.

12. A conveyer system such as described comprising a series of plates adapted to have containers mounted thereon; means for heating said containers on said plates; an articulated chain belt secured to said plates on one side thereof: sprocket wheels for maintaining said chain belt in predetermined relation; means for moving said belt by rotation of one of said sprocket wheels; guide tracks mounted beneath said series of plates and casters swivelly mounted on the under face of said plates and engaging said guide tracks for supporting said conveyer in operative position.

13. A conveyer system such as described comprising a series of plates adapted to have containers mounted thereon; an articulated chain belt secured to said plates on one side thereof; sprocket wheels for maintaining said chain belt in predetermined relation; means for moving said belt by rotation of one of said sprocket wheels; guide tracks mounted beneath said series of plates and casters swivelly mounted on the under face of said plates and engaging said guide tracks for supporting said conveyer in operative position and means for supplying certain of said containers with a heating medium from a relatively stationary source.

14. A dispensing system such as described comprising, a conveyer composed of a series of plates adapted to have containers mounted thereon; an articulated chain belt secured at one side of said plates; means for moving said chain belt through a predetermined course and casters swivelly mounted on the under side of said plates for supporting the same in operative position.

15. A dispensing system such as described comprising an articulate conveyer, means for moving said conveyer through a predetermined course, a platform contiguous to said conveyer whereby articles may be removed from the conveyer onto said platform said conveyer including a series of supporting plates and means for supplying certain said plates with a heating medium from a relatively stationary source.

16. A food serving mechanism comprising a series of plates adapted to have containers mounted thereon, an articulated chain belt secured to said plates on one side thereof, sprocket wheels for maintaining said chain belt in predetermined relation, means for moving said belt by rotation of said sprocket wheels, guide tracks mounted beneath said series of plates and caster wheels swivelly mounted under said plates and engaging said guide tracks for supporting said conveyer in operative position.

JOHN M. BAITINGER.